(12) United States Patent
Kwon et al.

(10) Patent No.: US 11,586,239 B2
(45) Date of Patent: Feb. 21, 2023

(54) ELECTRONIC DEVICE AND METHOD FOR CONTROLLING DEVICE CLOCK FREQUENCIES BASED ON DETECTED LINK INFORMATION

(71) Applicant: SK hynix Inc., Icheon-si (KR)

(72) Inventors: Ku Ik Kwon, Icheon-si (KR); Kyeong Seok Kim, Icheon-si (KR); Su Ik Park, Icheon-si (KR); Yong Joon Joo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/354,548

(22) Filed: Jun. 22, 2021

(65) Prior Publication Data

US 2022/0057827 A1 Feb. 24, 2022

(30) Foreign Application Priority Data

Aug. 21, 2020 (KR) ........................ 10-2020-0105211

(51) Int. Cl.
*G06F 1/08* (2006.01)
*G06F 1/324* (2019.01)
*G06F 9/4401* (2018.01)
*G06F 13/16* (2006.01)
*G06F 1/04* (2006.01)
*G06F 13/00* (2006.01)

(52) U.S. Cl.
CPC ............... *G06F 1/08* (2013.01); *G06F 1/324* (2013.01); *G06F 9/4401* (2013.01); *G06F 13/1668* (2013.01); *G06F 1/04* (2013.01); *G06F 13/00* (2013.01)

(58) Field of Classification Search
CPC .......... G06F 1/08; G06F 1/324; G06F 9/4401; G06F 13/1668; G06F 1/04; G06F 13/00
USPC ............................ 713/2, 500, 600; 710/100
See application file for complete search history.

(56) References Cited

U.S. PATENT DOCUMENTS

| | | | |
|---|---|---|---|
| 10,169,262 B2 | 1/2019 | West et al. | |
| 2005/0091425 A1* | 4/2005 | Wyatt | G06F 3/0674 710/33 |
| 2010/0274953 A1* | 10/2010 | Lee | G06F 12/0607 711/E12.001 |
| 2016/0154449 A1* | 6/2016 | Lim | G06F 1/3296 713/322 |
| 2019/0042507 A1* | 2/2019 | Venkatesan | H04L 25/08 |
| 2020/0064898 A1* | 2/2020 | Shen | G06F 1/08 |

* cited by examiner

*Primary Examiner* — Ji H Bae
(74) *Attorney, Agent, or Firm* — Perkins Coie LLP

(57) ABSTRACT

Electronic devices are disclosed. In some implementations, an electronic device includes a device interface to provide an interface to a host and detect link information associated with a bandwidth provided by the device interface in communicating with the host, a processor coupled to the device interface to be in communication with the host, and structured to be operable to control operations of the electronic device in response to a request received from the host through the device interface, and a clock generator coupled to provide the device interface and the processor with clock signals to be used to operate the device interface and the processor. The processor is configured to adjust frequencies of the clock signals based on the link information.

18 Claims, 6 Drawing Sheets

FIG. 2

| Number of Lane / PCIe Version | 1 Lane | 2 Lane | 4 Lane | 8 Lane | 16 Lane |
|---|---|---|---|---|---|
| 1.X | 250MB/s | 500MB/s | 1GB/s | 2GB/s | 4GB/s |
| 2.X | 500MB/s | 1GB/s | 2GB/s | 4GB/s | 8GB/s |
| 3.X | 984.6MB/s | 1.97GB/s | 3.94GB/s | 7.88GB/s | 15.75GB/s |
| 4.0 | 1.969GB/s | 3.94GB/s | 7.88GB/s | 15.75GB/s | 31.51GB/s |
| 5.0 | 3.938GB/s | 7.88GB/s | 15.75GB/s | 31.51GB/s | 63GB/s |
| 6.0 | - | - | - | - | 256GB/s |

FIG. 5

| Number of Lane / Link Version | | 1 Lane | 2 Lane | 4 Lane | LUT |
|---|---|---|---|---|---|
| ... | ... | ... | ... | ... | |
| ... | ... | ... | ... | ... | |
| 3.X | HOST I/F | ... | HOST I/F | HOST I/F | |
| | PROCESSOR | ... | PROCESSOR | PROCESSOR | |
| | MEMORY I/F | ... | MEMORY I/F | MEMORY I/F | |
| | MEMORY | ... | MEMORY | MEMORY | |
| | MEMORY DEVICE | ... | MEMORY DEVICE | MEMORY DEVICE | |
| 4.0 | HOST I/F | ... | HOST I/F | HOST I/F | |
| | PROCESSOR | ... | PROCESSOR | PROCESSOR | |
| | MEMORY I/F | ... | MEMORY I/F | MEMORY I/F | |
| | MEMORY | ... | MEMORY | MEMORY | |
| | MEMORY DEVICE | ... | MEMORY DEVICE | MEMORY DEVICE | |
| 5.0 | HOST I/F | ... | HOST I/F | HOST I/F | CLOCK1_MAX |
| | PROCESSOR | ... | PROCESSOR | PROCESSOR | CLOCK2_MAX |
| | MEMORY I/F | ... | MEMORY I/F | MEMORY I/F | CLOCK3_MAX |
| | MEMORY | ... | MEMORY | MEMORY | CLOCK4_MAX |
| | MEMORY DEVICE | ... | MEMORY DEVICE | MEMORY DEVICE | CLOCK5_MAX |

# ELECTRONIC DEVICE AND METHOD FOR CONTROLLING DEVICE CLOCK FREQUENCIES BASED ON DETECTED LINK INFORMATION

CROSS-REFERENCE TO RELATED APPLICATION

This patent document claims the priority and benefits of Korean Patent Application No. 10-2020-0105211, filed on Aug. 21, 2020, the disclosure of which is incorporated herein by reference in its entirety.

TECHNICAL FIELD

Various embodiments of the present disclosure relate to an electronic device that performs an operation in response to a request of a host, and an operating method thereof.

BACKGROUND

The computer environment paradigm is transitioning to ubiquitous computing, which enables computing to appear anytime and anywhere. The recent increase in the use of ubiquitous computing is leading to an increase in the use of portable electronic devices such as mobile phones, digital cameras, and laptop computers. These portable electronic devices generally use a memory system having semiconductor memory devices as its data storage medium. A memory system may be used as a main memory device or an auxiliary memory device of a portable electronic device.

Such a semiconductor-based memory system provides advantages over the traditional hard disk drives since semiconductor memory devices have no moving parts, and thus offers excellent stability and durability, high data rate, and low power consumption. Examples of semiconductor-based memory systems include universal serial bus (USB) memory devices, memory cards, and solid state drives (SSD).

SUMMARY

The embodiments of the of the disclosed technology relate to an electronic device that prevents unnecessary power consumption and heat generation by controlling clock frequencies of components thereof, and an operating method of the electronic device.

In some implementations, an electronic device includes a device interface to provide an interface to a host and detect link information associated with a bandwidth provided by the device interface in communicating with the host, a processor coupled to the device interface to be in communication with the host, and structured to be operable to control operations of the electronic device in response to a request received from the host through the device interface, and a clock generator coupled to provide the device interface and the processor with clock signals to be used to operate the device interface and the processor. The processor is configured to adjust frequencies of the clock signals based on the link information.

In some implementations, an operating method of an electronic device includes detecting link information associated with a bandwidth provided by a device interface in communicating with a host, adjusting frequencies of clock signals that are used to operate the electronic device based on the detected link information, and providing the electronic device with clock signals having frequencies that are adjusted based on the detected link information.

In some implementations, an electronic device includes a device interface suitable for supporting interfacing with a host, and detecting link information with the host, a processor, and a clock generator suitable for providing the device interface and the processor with clock signals, wherein the processor controls frequencies of the clock signals based on the link information.

In some implementations, an operating method of an electronic device includes detecting link information with a host, and providing a host interface and a processor, included in the electronic device, with clock signals having frequencies determined based on the detected link information.

BRIEF DESCRIPTION OF THE DRAWINGS

FIG. 2 is a diagram illustrating compatibility between interfaces.

FIG. 5 is a diagram illustrating a lookup table stored in an electronic device based on an embodiment of the disclosed technology.

DETAILED DESCRIPTION

Hereinafter, various embodiments of the present disclosure are described below in detail with reference to the accompanying drawings.

Figure 1:
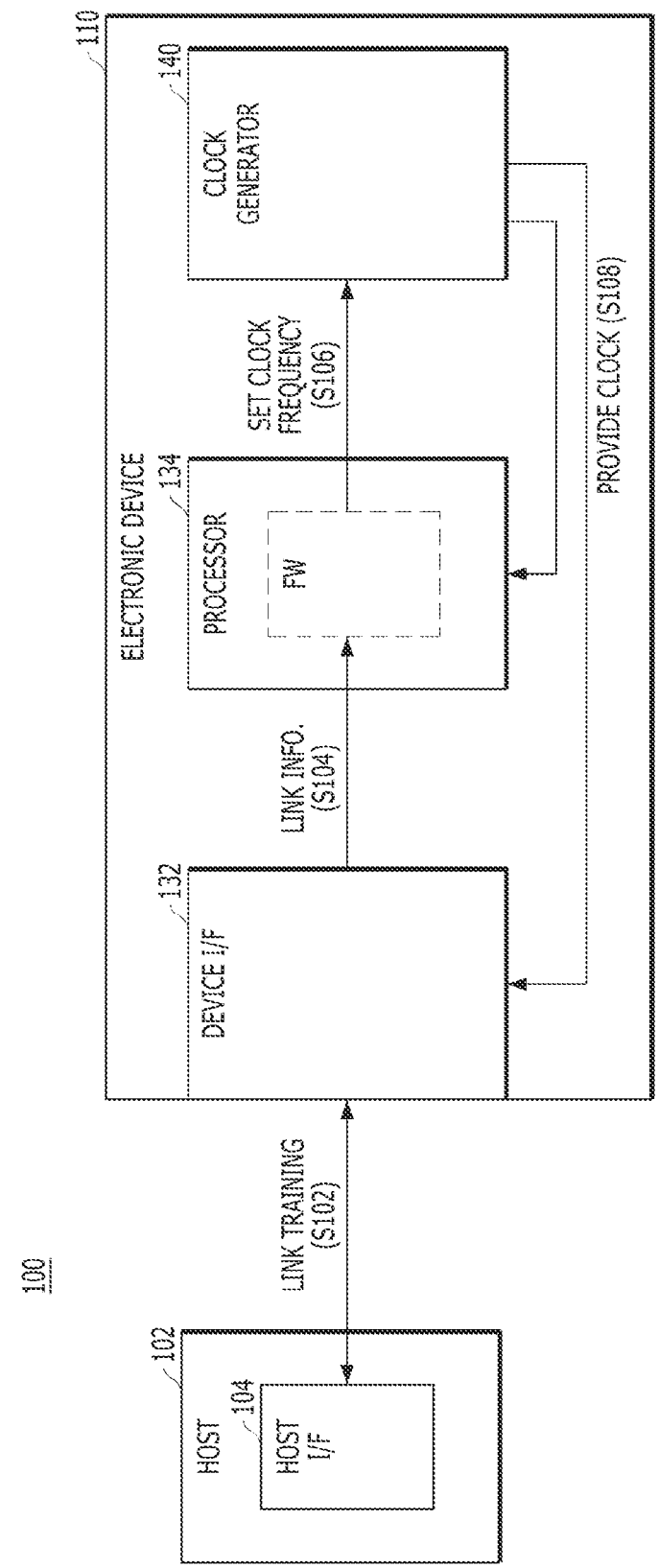
FIG. 1 is a block diagram illustrating an example of a data processing system including an electronic device based on an embodiment of the disclosed technology.

FIG. 1 is a block diagram illustrating a data processing system 100 including an electronic device 110 based on an embodiment of the disclosed technology.

Referring to FIG. 1, the data processing system 100 may include a host 102 and the electronic device 110 in communication with the host 102.

The host 102 may include portable electronic devices such as a mobile phone, MP3 player and laptop computer. The host 102 may also include non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the electronic device 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The host 102 may include a host interface 104 for exchanging data with the electronic device 110.

The electronic device 110 may perform an operation in response to a request of the host 102. For example, the electronic device 110 may include a data storage device to store data of the host 102 in response to the request of the host 102.

The electronic device 110 may include a device interface 132, a processor 134 and a clock generator 140.

The electronic device 110 may exchange data with the host 102 through the device interface 132. The device I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

Even though interface versions of the host interface 104 and the device interface 132 are different or the numbers of lanes of the interfaces are different, the electronic device 110 and the host 102 may exchange data therebetween. Compatibility between interfaces will be described with reference to FIG. 2.

FIG. 2 is a diagram illustrating the compatibility between interfaces.

FIG. 2 illustrates a maximum data transfer rate based on a PCIe interface version and the number of interface lanes. Referring to FIG. 2, the higher the interface version, the higher the maximum data transfer rate. In addition, the maximum data transfer rate may increase in proportion to the number of lanes. In some implementations, the electronic device 110 or the data storage device in the electronic device 110 may be connected to the main printed circuit board (e.g., motherboard) of a computer system via a PCIe (peripheral component interconnect express). In some implementations, the electronic device 110 or the data storage device in the electronic device 110 may include PCIe solid-state drives (SSDs) that are connected via PCIe to a computer from its peripherals to integrate flash memories directly on a motherboard of the computer.

When the interface version of the host interface 104 and the interface version of the device interface 132 are different, or when the host interface 104 and the device interface 132 have different numbers of lanes, the maximum data transfer rates of the interfaces may be different. When the maximum data transfer rates of the host interface 104 and the device interface 132 are different, the host 102 and the electronic device 110 may exchange data at a lower data transfer rate between the maximum data transfer rates of the host interface 104 and the device interface 132.

For example, when a PCIe 5.0 version of the device interface 132 including four lanes is connected to a PCIe 4.0 version of the host interface 104 including two lanes, the host 102 and the electronic device 110 may use two lanes as supported by the PCIe 4.0 version to exchange data therebetween. Referring to FIG. 2, even though the device interface 132 supports the maximum data transfer rate of 15.75 GB/s, the host 102 and the electronic device 110 may exchange data therebetween at the rate of 3.94 GB/s.

FIG. 2 illustrates the compatibility between the host interface 104 and the device interface 132, which support a PCIe protocol. However, an interface supporting other protocols in addition to the PCIe protocol may support backward compatibility. For example, even though the host interface 104 and the device interface 132 support different versions of a USB protocol or a SATA protocol, the host interface 104 and the device interface 132 may be connected using a lower version protocol to exchange data therebetween.

Referring back to FIG. 1, the processor 134 may control general operations of the electronic device 110 in response to a request received from the host 102 through the device interface 132, and may perform various data processing operations. The processor 134 may perform firmware FW operations to control the operations of the electronic device 110.

The clock generator 140 may generate a clock signal, and provide the device interface 132 and the processor 134 with the clock signal. In some implementations, the clock signal may include a core clock associated with the operating frequency of the processor 134 and/or the device interface 132.

As the data transfer rate of the device interface 132 increases, a maximum clock frequency required for the device interface 132 increases. In addition, a maximum clock frequency required for the processor 134 also increases as the data transfer rate of the device interface 132 increases and to meet the requirements of the high-performance electronic device 110. For example, when the electronic device 110 is a memory device for storing data of the host 102, the protocol used by the electronic device 110 may specify requirements for read and write operations, according to the version and the number of lanes of the device interface 132. The maximum clock frequencies of the device interface 132 and the processor 134 included in the electronic device 110 may be determined based on the required read and write operation performance.

As the clock frequencies of the device interface 132 and the processor 134 increase, the electronic device 110 will consume more power and generate more heat. However, even if the device interface 132 and the processor 134 operate at the maximum clock frequency, the electronic device 110 may not exhibit the maximum performance when the device interface 132 is connected to an interface having a lower version or having fewer lanes because the interface between the device interface 132 and the host interface 104 will reduce the data processing performance capability of the device interface 132 and the processor 134. When the device interface 132 and the processor 134 operate at a fixed maximum clock frequency, the electronic device 110 may consume unnecessary power, depending on the interface version and number of lanes of the host interface 104 connected to the device interface 132.

The disclosed technology can be implemented in some embodiments to provide a method of preventing the power consumption and heat generation of the electronic device 110 when the device interface 132 is connected to an interface of lower version or an interface having fewer lanes.

In some embodiments of the disclosed technology, referring to FIG. 1, the device interface 132 may perform a link training operation on a link to the host interface 104 at S102, and the processor 134 may obtain link information from the device interface 132 that is trained by the link training operation, at S104. In some implementations, the link information may include information on the version and the lane count of the interfaces that are connected between the host 102 and the electronic device 110. At S106, the processor 134 may determine or adjust a clock frequency to be provided to the device interface 132 and the processor 134, based on the link information. For example, when the processor 134 detects that the device interface 132 is connected to a lower version interface or an interface with fewer lanes, based on the link information, the processor may adjust the clock frequency so that a clock with a frequency lower than the maximum clock frequency is provided to the device interface 132 and the processor 134. At S108, the clock generator 140 may provide the device interface 132 and the processor 134 with a clock signal with the adjusted clock frequency.

In some embodiments of the disclosed technology, the processor 134 may control the clock frequencies of the device interface 132 and the processor 134 based on the link information, thereby preventing unnecessary power consumption and heat generation.

Figure 3:
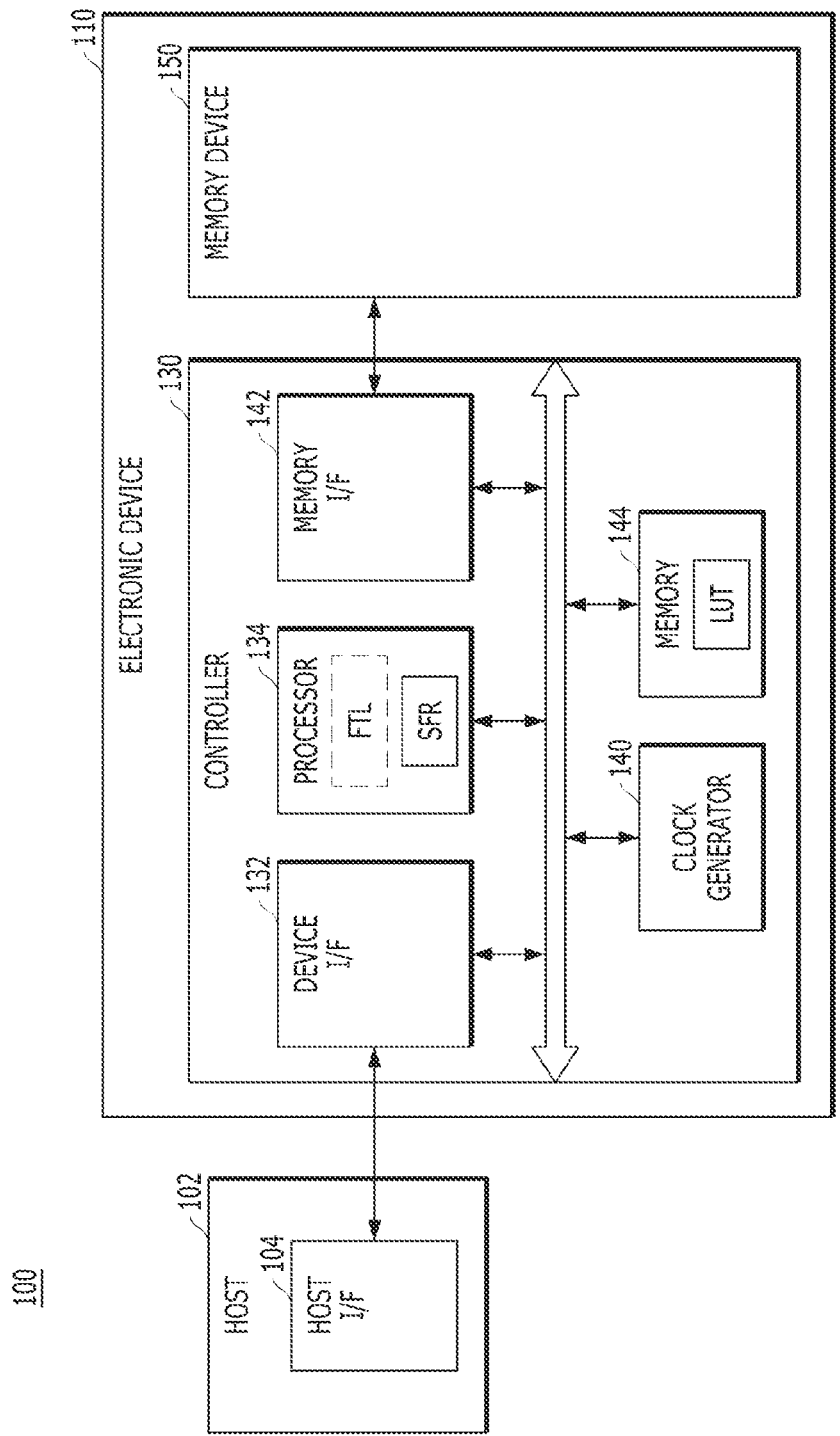
FIG. 3 is a block diagram illustrating an example of a data processing system including an electronic device based on an embodiment of the disclosed technology.

FIG. 3 is a block diagram illustrating an example of a data processing system 100 including an electronic device 110 based on an embodiment of the disclosed technology.

The data processing system 100 may include a host 102 and the electronic device 110. The host 102 and electronic device 110 of FIG. 3 may correspond to the host 102 and electronic device 110 described above with reference to FIG. 1, respectively.

The electronic device 110 shown in FIG. 3 may operate to store data for the host 102 in response to a request of the host 102. Non-limiting examples of the electronic device 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), a reduced size MMC (RS-MMC) and a micro-MMC, a hard disk drive (HDD), and the like. The SD card may include a mini-SD card and micro-SD card.

The electronic device 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM), a magnetic disk and a flash memory. The flash memory may have a 3-dimensional (3D) stack structure.

The electronic device 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). In addition, the controller 130 and the memory device 150 may be integrated into one semiconductor device such as a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Examples of the electronic device 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even in the absence of power supply. The memory device 150 may perform a program operation to store data provided from the host 102, and may perform a read operation to provide data stored therein to the host 102. In some implementations, the memory device 150 may include a plurality of memory blocks each of which may include a plurality of pages, and each of the pages may include a plurality of memory cells coupled to a word line. In an embodiment of the disclosed technology, the memory device 150 may be a flash memory. The flash memory may have a 3-dimensional (3D) stack structure.

The controller 130 may control read and write operations of the memory device 150 in response to a request from the host 102. For example, the controller 130 may provide data read from the memory device 150 to the host 102 during the read operation, and write data provided from the host 102 into the memory device 150 during the write operation. The controller 130 may also control an erase operation of the memory device 150.

The controller 130 may include a device interface 132, a processor 134, a clock generator 140, a memory interface 142 and a memory 144, which are connected to one another through an internal bus. The device interface 132, processor 134 and clock generator 140 illustrated in FIG. 3 may correspond to the device interface 132, processor 134 and clock generator 140 described above with reference to FIG. 1, respectively.

The device interface 132 may be operated using firmware referred to as a host interface layer (HIL).

The processor 134 may control the overall operations of the electronic device 110. The processor 134 may perform firmware operations to control the overall operations of the electronic device 110. The firmware may include flash translation layer (FTL). Also, the processor 134 may include a microprocessor or a central processing unit (CPU).

The processor 134 may perform operations associated with the FTL and perform foreground operations corresponding to requests received from the host. For example, the processor 134 may control a write operation of the memory device 150 in response to a write request from the host and control a read operation of the memory device 150 in response to a read request from the host.

Also, the controller 130 may perform a background operation on the memory device 150. For example, the background operation may include a garbage collection (GC) operation, a wear-leveling (WL) operation, a map flush operation, or a bad block management operation.

The processor 134 may include a register SFR. The register SFR may store information necessary for the processor 134 to control an operation of the electronic device 110.

In some embodiments of the disclosed technology, the device interface 132 may store, in the register SFR, link information associated with a bandwidth for the communication between the host interface 104 and the device interface 132. The processor 134 may determine or adjust a clock frequency based on the link information, and store determined or adjusted clock frequency information in the register SFR. The clock generator 140 may obtain the clock frequency information from the register SFR, and generate or adjust clock signals based on the clock frequency information and provide the clock signals to the processor 134.

The memory I/F 142 may serve as a memory/data storage interface to provide an interface to the controller 130 and the memory device 150 such that the controller 130 controls the operations of the memory device 150 in response to a request from the host 102. When the memory device 150 is a flash memory such as a NAND flash memory, the memory I/F 142 may generate a control signal for performing the operations of the memory device 150 and process data to be provided to the memory device 150 based on control signals or instructions of the processor 134. The memory I/F 142 may provide an interface (e.g., a NAND flash interface) for processing a command and data between the controller 130 and the memory device 150. Specifically, the memory I/F 142 may support data transfer between the controller 130 and the memory device 150.

The memory I/F 142 may be operated by performing firmware operations such as operations associated with a flash interface layer (FIL) and may be used to exchange data with the memory device 150.

The memory 144 may serve as a working memory of the electronic device 110 and the controller 130, and store data such as instructions, command, parameters for operating the electronic device 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

In some implementations, the memory 144 may include a volatile memory. For example, the memory 144 may include at least one of static random access memory (SRAM) or dynamic random access memory (DRAM). In an implementation, the memory 144 may be integrated into the controller 130, and in another implementation, the memory 144 is separate from the controller 130. In an embodiment of the disclosed technology, the memory 144 may be an external volatile memory having a memory interface transferring data between the memory 144 and the controller 130.

As described above, the memory 144 may store data required for performing a data write/read operation between the host and the memory device 150. In some implementations, the memory 144 may include a program memory, data memory, write buffer/cache, read buffer/cache, data buffer/cache, or map buffer/cache.

The memory 144 may store a lookup table LUT including mapping information between the link information and the clock frequency. For example, the lookup table LUT may be stored in the memory device 150, and may be loaded into the memory 144 when the electronic device 110 is booted.

The clock generator 140 may generate a clock signal and provide the clock signal to components that need to be controlled by the clock signal among components of the electronic device 110, such as the memory interface 142, the memory 144 and the memory device 150 as well as the processor 134 and the device interface 132.

Figure 4:
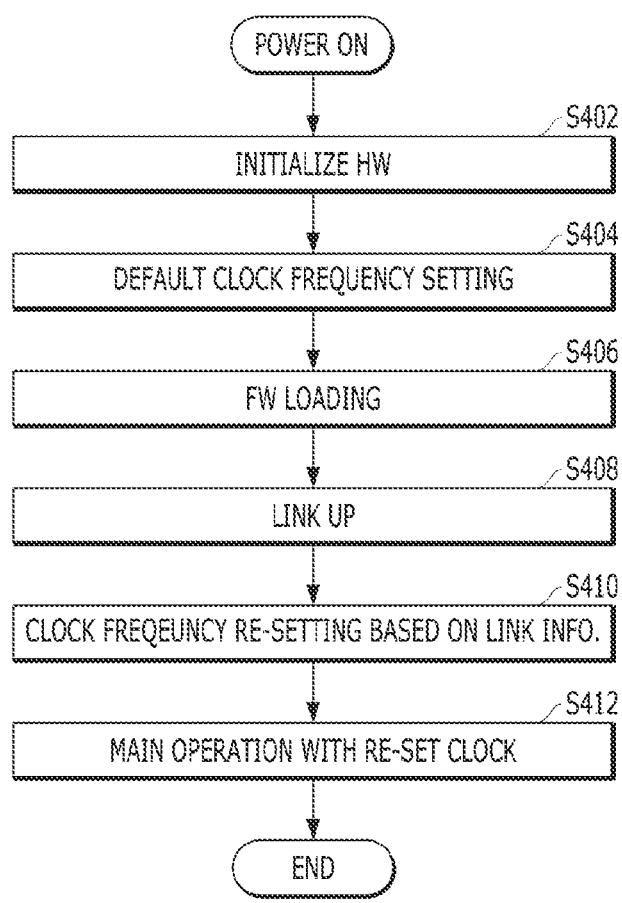
FIG. 4 is a flowchart illustrating an operating method of an electronic device based on an embodiment of the disclosed technology.

FIG. 4 is a flowchart illustrating an operating method of an electronic device 110 based on an embodiment of the disclosed technology.

When power is supplied to the electronic device 110, the electronic device 110 may perform a booting operation at S402, S404, S406, S408 and S410.

At S402, the electronic device 110 may initialize internal hardware components of the electronic device 110.

For example, the processor 134 may initialize the host interface 132, the processor 134, the clock generator 140, the memory interface 142 and the memory 144 based on a boot code stored in a boot loader (not illustrated) of the electronic device 110.

At S404, the processor 134 may set a clock frequency of the clock generator 140 to a default clock frequency.

For example, the default clock frequency may be the maximum clock frequency of each of the host interface 132, the processor 134, the memory interface 142, the memory 144 and the memory device 150. The clock generator 140 may provide the host interface 132, the processor 134, the memory interface 142, the memory 144 and the memory device 150 with a clock signal having the default clock frequency.

At S406, the processor 134 may load a firmware code, stored in the memory device 150, into the memory 144 based on the boot code. The device interface 132 may perform a link training operation on the host interface 104 between the electronic device 110 and the host 102.

At S408, the processor 134 may detect a "link up" state.

The link up state refers to a state in which the link training operation of the device interface 132 with the host interface 104 is completed. In the link up state, data can be exchanged between the electronic device 110 and the host 102.

As described with reference to FIG. 2, the data transfer rates of the device interface 132 and the host interface 104 may be limited to the lower rate of the device interface 132 and the host interface 104. For example, as described with reference to FIG. 2, when the device interface 132 is connected to the host interface 104 having a lower version or fewer lanes, the data transfer rate of the device interface 132 may be limited according to the interface version or the number of lanes of the host interface 104.

Upon completion of the link training operation of the device interface 132, the link version and the number of link lanes between the host 102 and the electronic device 110 may be determined, and the device interface 132 may store link information including the link version information and link lane count in a first region of the register SFR.

At S410, the processor 134 may reset the clock frequency based on the link information.

For example, the processor 134 may access the first region of the register SFR and obtain the link version information and the link lane count.

The processor 134 may determine or adjust a clock frequency based on the link information by referring to the lookup table LUT loaded in the memory 144. In addition, the processor 134 may control the clock generator 140 to provide the components of the electronic device 110 with the clock signal that are determined or adjusted based on the link information.

Figure 6:
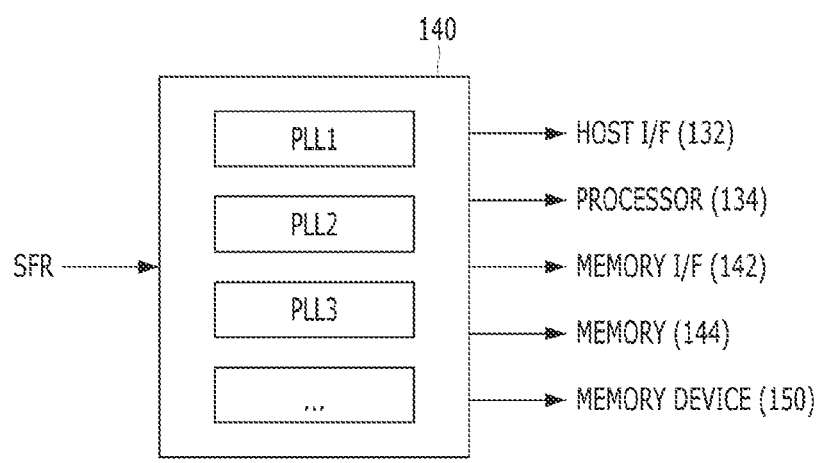
FIG. 6 is a diagram illustrating a clock generator included in an electronic device based on an embodiment of the disclosed technology.

FIG. 5 illustrates an example of the lookup table LUT, and FIG. 6 illustrates an example of the clock generator 140.

FIG. 5 is a diagram illustrating the lookup table LUT stored in the electronic device 110 based on an embodiment of the disclosed technology.

The lookup table LUT may store clock frequencies of the components of the electronic device 110 according to the link information. FIG. 5 illustrates the lookup table LUT that lists the clock frequencies of the host interface 132, the processor 134, the memory interface 142, the memory 144 and the memory device 150, varying depending on the link version and the number of link lanes.

The clock frequency for each component of the electronic device 110 according to the link version and the number of link lanes may be determined in advance. The requirements for read and write operation performance of the electronic device 110 may vary depending on the link version and the number of link lanes. The clock frequency for each component of the electronic device 110 may be determined based on the required read and write operation performance.

For example, when the link version is PCIe 4.0 and the number of link lanes is four, data may be exchanged at a maximum rate of 7.88 GB/s between the host 102 and the electronic device 110. The electronic device 110 may be designed to exhibit a maximum performance of 6.5 GB/s or higher in consideration of the bottleneck issues. The electronic device 110 may be designed to exhibit a sequential read performance of 6.5 GB/s or higher and to exhibit a sequential write performance, a random read performance and a random write performance which are equal to or higher than respective target performances. The target performance of the electronic device 110 may vary depending on the link version and the number of link lanes, and the clock frequency for each component of the electronic device 110 may be experimentally determined in advance in order to satisfy the target performance for each of the link version and number of link lanes. For example, the clock frequency for each component of the electronic device 110 may be determined to be lower as the link version is lowered, and may be determined to be lower as the number of link lanes decreases.

FIG. 5 illustrates the lookup table LUT when the device interface 132 is a PCIe 5.0 version interface including four lanes. In some implementations, the clock frequencies may be adjusted based on the lookup table LUT. For example, when the link version is PCIe 5.0 and the number of link lanes is four after the link training operation on the host interface 104, the processor 134 may increase the clock frequencies of the components of the electronic device 110 to the maximum clock frequency, based on the lookup table LUT. When the link version is lower than PCIe 5.0 or the number of link lanes is less than four as the result of the link training operation with the host interface 104, the processor 134 may decrease the clock frequencies of the components of the electronic device 110 to a clock frequency lower than the maximum clock frequency, based on the lookup table LUT.

The processor 134 may store clock frequency information for each component of the electronic device 110 determined based on the lookup table LUT in a second region of the register SFR. The clock generator 140 may obtain the clock frequency information for each component of the electronic device 110 from the second region of the register SFR.

Although in some implementations the device interface 132 is a PCIe interface and is connected to the host interface 104, which is a PCIe interface, the present disclosure is not limited thereto. In some implementations, the device interface 132 and the host interface 104 may be interfaces that support backward compatibility. In some implementations, the device interface 132 and the host interface 104 may be interfaces that support a SATA protocol or a USB protocol.

FIG. 6 is a diagram illustrating the clock generator 140 included in the electronic device 110 based on an embodiment of the disclosed technology.

The clock generator 140 may include a plurality of phase-locked loops PLL1, PLL2 and PLL3. Each of the plurality of phase-locked loops PLL1, PLL2 and PLL3 may include an oscillator for generating clock signals having different frequencies and a divider for dividing a clock frequency.

The clock generator 140 may generate clock signals having various clock frequencies, stored in the lookup table LUT, by determining a division ratio of the plurality of phase-locked loops PLL1, PLL2 and PLL3. For example, the clock frequency information stored in the second region of the register SFR by the processor 134 may include information on a phase-locked loop which divides the clock frequency among the plurality of phase-locked loops PLL1, PLL2, and PLL3 and a ratio by which the clock frequency is divided.

The clock generator 140 may obtain the information from the second region of the register SFR, and generate a clock signal to be provided to each component of the electronic device 110, by using the plurality of phase-locked loops PLL1, PLL2, and PLL3. In addition, the clock generator 140 may provide the generated clock signal to each component of the electronic device 110. FIG. 6 illustrates a case where the clock signal generated by the clock generator 140 is provided to the host interface 132, the processor 134, the memory interface 142, the memory 144 and the memory device 150.

As shown at S410 in FIG. 4 and FIGS. 5 and 6, when the processor 134 resets the clock frequency based on the link information, the booting operation of the electronic device 110 may be completed.

Referring back to FIG. 4, at S412, the electronic device 110 may perform a main operation based on the clock signal provided according to the reset clock frequency. The main operation, which is an operation performed by the electronic device 110 after the booting operation is performed, may include a foreground operation and a background operation.

In some embodiments of the disclosed technology, the processor 134 may control the clock frequency of the clock signal provided to each component of the electronic device 110, based on the link information with the host 102. When the device interface 132 is connected to a lower version host interface or a narrower bandwidth host interface 104 (e.g., the link version of the host interface is lower than the interface version supported by the device interface 132, or the host interface has fewer lanes that the device interface 132), the processor 134 may adjust the clock frequency of the clock signal provided to each component of the electronic device 110 to be lower than the maximum clock frequency of each component, thereby preventing unnecessary power consumption and heat generation of the electronic device 110. As such, performance degradation in the electronic device 110 may also be prevented since thermal throttling is prevented.

In some embodiments of the disclosed technology, it is possible to prevent unnecessary power consumption and heat generation by adjusting clock frequencies of components of electronic devices based on the link version and bandwidth (e.g., number of lanes) of the interface.

While specific embodiments have been described in the detailed description of the present disclosure, various changes and modifications of the disclosed embodiments and other embodiments may be made based on the disclosure of this patent document.

What is claimed is:

1. An electronic device comprising:
a device interface to provide an interface to a host and detect link information associated with a bandwidth provided by the device interface in communicating with the host;
a processor coupled to the device interface to be in communication with the host, and configured to control operations of the electronic device in response to a request received from the host through the device interface; and
a clock generator coupled to provide the device interface and the processor with clock signals to be used to operate the device interface and the processor,
wherein the processor is configured to adjust frequencies of the clock signals based on the link information,
wherein the link information includes link version information or link lane count or both the link version information and the link lane count.

2. The electronic device of claim 1, wherein the device interface performs a link training operation on a link to the host by using an interface of a lower version between the device interface and an interface of the host, and selects information on the lower-version interface as the link version information.

3. The electronic device of claim 1, wherein the device interface performs a link training operation on a link to the host by using an interface having a smaller number of lanes between the device interface and an interface of the host, and selects the interface having the smaller number of lanes as the link lane count.

4. The electronic device of claim 1, wherein the processor adjust the frequencies of the clock signals to use a lower frequency clock for a lower-version interface or an interface having a smaller number of lanes.

5. The electronic device of claim 1, wherein the device interface performs a link training operation on a link to the host during booting of the electronic device and detects the link information after completion of the link training operation.

6. The electronic device of claim 5, wherein the processor obtains the link information upon completion of the link training operation and terminates the booting of the electronic device after adjusting the frequencies of the clock signals.

7. The electronic device of claim 1, wherein the processor adjusts the frequencies of the clock signals based on a lookup table mapping frequencies of the clock signals to the link information.

8. The electronic device of claim 1, wherein the processor further includes a register, and the device interface stores the detected link information in the register.

9. The electronic device of claim 8, wherein the processor adjusts the frequencies of the clock signals based on the link information and stores the adjusted frequencies of the clock signals in the register, and
wherein the clock generator provides the device interface and the processor with the clock signals based on the frequencies of the clock signals stored in the register.

10. The electronic device of claim 1, further comprising:
a first memory device including one or more data storage components configured to store data;
a memory interface to provide an interface between the first memory device and the processor; and
a second memory device to store data for operating the electronic device,
wherein the clock generator further provides the first memory device, the memory interface and the second memory device with the clock signals, and
wherein the processor further adjusts the clock signals of the first memory device, the memory interface and the second memory device based on the detected link information.

11. An operating method of an electronic device, comprising:
detecting link information associated with a bandwidth provided by a device interface in communicating with a host;
adjusting frequencies of a plurality of clock signals that are used to operate the electronic device based on the detected link information; and
providing the electronic device with the plurality of clock signals having frequencies that are adjusted based on the detected link information,
wherein the link information includes link version information or link lane count or both the link version information and the link lane count.

12. The operating method of claim 11, wherein the detecting of the link information includes:
performing a link training operation on a link to the host by using an interface of a lower version between the device interface and an interface of the host; and
selecting information on the lower-version interface as the link version information.

13. The operating method of claim 11, wherein the detecting of the link information includes:
performing a link training operation on a link to the host by using an interface having a smaller number of lanes between the device interface and an interface of the host; and
selecting the smaller number of lanes as the link lane count.

14. The operating method of claim 11, wherein the providing of the clock signals includes adjusting the frequencies of the clock signals to use a lower frequency clock for a lower-version interface or an interface having a smaller number of lanes.

15. The operating method of claim 11, further comprising performing a link training operation on a link to the host during booting of the electronic device,
wherein the detecting of the link information is performed after the link training operation is completed.

16. The operating method of claim 15, further comprising terminating the booting of the electronic device after adjusting the frequencies of the clock signals the electronic device based on the detected link information.

17. The operating method of claim 11, wherein the adjusting of the frequencies of clock signals includes adjusting the frequencies of the clock signals based on a lookup table mapping frequencies of the clock signals to the link information.

18. The operating method of claim 11, further comprising providing a memory device, a memory interface and a memory in the electronic device with the clock signals having the frequencies adjusted based on the detected link information.

* * * * *